United States Patent [19]

Abdo

[11] Patent Number: 4,857,169

[45] Date of Patent: Aug. 15, 1989

[54] HYDROCRACKING PROCESS UTILIZING A CATALYST HAVING A REDUCED ZEOLITE CONTENT

[75] Inventor: Suheil F. Abdo, Diamond Bar, Calif.

[73] Assignee: Union Oil Company of California, Los Angeles, Calif.

[21] Appl. No.: 119,168

[22] Filed: Nov. 10, 1987

Related U.S. Application Data

[62] Division of Ser. No. 673,520, Nov. 20, 1984, abandoned.

[51] Int. Cl.$^4$ ............................................. C10G 65/10
[52] U.S. Cl. ....................................... 208/59; 208/89; 208/111
[58] Field of Search ...................... 208/58, 59, 89, 111

[56] References Cited

U.S. PATENT DOCUMENTS

| | | | |
|---|---|---|---|
| 3,267,022 | 8/1966 | Hansford | 208/111 |
| 3,506,400 | 4/1970 | Eberly, Jr. et al. | 23/182 |
| 3,640,681 | 2/1972 | Pickert | 23/111 |
| 3,897,327 | 7/1975 | Ward | 208/111 |
| 3,929,672 | 12/1975 | Ward | 252/455 Z |
| 4,252,688 | 2/1981 | Gallei et al. | 252/455 Z |
| 4,429,053 | 1/1984 | Ward | 502/65 |
| 4,456,693 | 6/1984 | Welsh | 502/65 |
| 4,503,023 | 3/1985 | Breck, deceased et al. | 423/328 |
| 4,604,187 | 8/1986 | Ward | 208/59 |
| 4,648,958 | 3/1987 | Ward | 208/111 |
| 4,664,776 | 5/1987 | Ward | 208/111 |
| 4,689,137 | 8/1987 | Clark | 208/89 |

FOREIGN PATENT DOCUMENTS 082211 6/1983 European Pat. Off. .............. 502/64

OTHER PUBLICATIONS

J. W. Ward, "Design and Preparation of Hydrocracking Catalysts," Preparation of Catalysts III, Elsevier Science Publishers, 1983, pp. 587–616.

Primary Examiner—Anthony McFarlane
Attorney, Agent, or Firm—Yale S. Finkle; Gregory F. Wirzbicki

[57] ABSTRACT

A catalyst composition composed of a porous, inorganic refractory oxide in intimate combination with between about 40 weight percent and about 70 weight percent of a crystalline aluminosilicate Y zeolite. The Y zeolite contains ion-exchanged Group VIII noble metal cations and preferably has a silica-to-alumina mole ratio above about 6.0. Such a catalyst containing the recited amount of zeolite has been found to possess higher than expected activity when used to hydrocrack feedstocks in an ammonia-deficient atmosphere and to retain activity for hydrocracking in ammonia-deficient atmospheres after regeneration. The most preferred Y zeolite for use in the catalyst has a silica-to-alumina mole ratio between about 6.1 and about 7.0 and is prepared by contacting an ammonium-exchanged Y zeolite with an aqueous solution of ammonium hexafluorosilicate.

22 Claims, 2 Drawing Sheets

HYDROCRACKING PROCESS UTILIZING A CATALYST HAVING A REDUCED ZEOLITE CONTENT

CROSS REFERENCE TO RELATED APPLICATIONS

This application is a divisional of U.S. patent application Ser. No. 673,520, filed in the United States Patent and Trademark Office on Nov. 20, 1984 and now abandoned.

BACKGROUND OF THE INVENTION

This invention relates to a hydrocarbon conversion process and a catalyst for use therein. The invention is particularly concerned with a hydrocracking catalyst having improved regeneration properties which contains reduced amounts of a noble metal-exchanged Y zeolite.

Petroleum refiners often produce desirable products, such as gasoline and turbine fuel, by catalytically hydrocracking high boiling hydrocarbons into product hydrocarbons of lower average molecular weight and boiling point. Hydrocracking is generally accomplished by contacting, in an appropriate reactor vessel, a gas oil or other hydrocarbon feedstock with molecular hydrogen in the presence of a suitable hydrocracking catalyst under appropriate conditions, including an elevated temperature and an elevated pressure, such that a hydrocarbon product is obtained containing a substantial proportion of a desired product boiling in a specified range, as for example, a gasoline boiling in the range of 185° F. to 420° F.

Hydrocracking is often carried out in conjunction with hydrotreating, usually by a method referred to as "integral operation." In this process, the hydrocarbon feedstock, usually a gas oil containing a substantial proportion of components boiling above a desired end point, is introduced into a catalytic hydrotreating zone wherein the feedstock is contacted with molecular hydrogen in the presence of a suitable catalyst, such as a non-zeolitic, particulate catalyst comprising a Group VIII metal component and a Group VIB metal component on a porous, inorganic refractory oxide support such as alumina under hydrotreating conditions to convert the organonitrogen components and the organosulfur components contained in the feedstock to ammonia and hydrogen sulfide, respectively. Subsequently, the entire effluent from the hydrotreating zone is contacted with a hydrocracking catalyst in a hydrocracking zone maintained under suitable conditions of elevated temperature, pressure, and hydrogen partial pressure, such that a substantial conversion of high boiling feed components to product components boiling below the desired end point is obtained. Usually, the hydrotreating and hydrocracking zones in integral operation are maintained in separate reactor vessels, but, on occasion, it may be advantageous to employ a single, downflow reactor vessel containing an upper bed of hydrotreating catalyst particles and a lower bed of hydrocracking particles.

In some integral operation refining processes, and especially those designed to produce gasoline from the heavier gas oils, a relatively high proportion of the product hydrocarbons obtained from integral operation will have a boiling point above the desired end point. For example, in the production of gasoline product boiling in the $C_4$ to 420° F. range from a gas oil boiling entirely above 570° F., it may often be the case that as much as 30 to 60 percent by volume of the products obtained from integral operation boil above 420° F. To convert these high boiling components to hydrocarbon components boiling below 420° F., the petroleum refiner separates the 420° F.+high boiling components from the other products obtained in integral operation, usually after first removing ammonia by a water washing operation, and subjects the 420° F.+unconverted fraction to further hydrocracking in a second hydrocracking zone wherein yet more conversion to the desired $C_4$ to 420° F. product takes place.

In the foregoing process, the two hydrocracking reaction zones often contain hydrocracking catalysts of the same composition. One catalyst suitable for such use contains 80 weight percent of a palladium-exchanged stabilized Y zeolite hydrocracking component and is disclosed as Catalyst A in Example 16 of U.S. Pat. No. 3,897,327, the disclosure of which patent is herein incorporated by reference in its entirety. Although the catalysts used in the two hydrocracking reaction zones may have the same composition and the same catalytic properties, the hydrocracking conditions required in the second hydrocracking reaction zone are less severe than those required in the first because ammonia is not present in the second hydrocracking reaction zone (due to water washing) whereas a significant amount of ammonia is present in the first hydrocracking zone. To account for the difference in operating conditions, it is believed that ammonia neutralizes or otherwise interferes with the acidity of the zeolite in the catalyst of the first reaction one, thereby forcing the refiner to employ relatively high temperatures. On the other hand, in the ammonia-deficient atmosphere of the second hydrocracking reaction zone, high conversions to the desired product are obtainable under relatively moderate conditions, often with an operating temperature between about 150° F. and about 210° F. lower than that required in the first hydrocracking reaction zone.

It has been discovered, however, that a difficult problem presents itself when the hydrocracking catalyst in the second hydrocracking zone must be regenerated. During hydrocracking, coke materials deposit on the catalyst particles, and since the coke interferes with the activity of the catalyst, it is necessary to periodically regenerate the catalyst by combustion of the coke. It has been found, however, that, after regeneration, the catalyst used in the second hydrocracking reaction zone loses substantial activity for hydrocracking under the relatively moderate conditions employed therein. It has also been found that, assuming identical catalysts are used in the two hydrocracking zones, both remain active after regeneration for use in the first reaction zone, but both exhibit substantial activity losses compared to fresh catalyst if used in the second hydrocracking reaction zone.

Many attempts have been made to overcome the detrimental effects associated with regenerating hydrocracking catalysts for use in the ammonia-deficient environments of the second hydrocracking zone, and particularly with respect to catalysts containing noble metal-exchanged zeolites. But these attempts have largely focused on methods for restoring some or all of the catalytic activity lost through regeneration or other high temperature operation. These restoration or rejuvenation methods generally involve treating the regenerated catalyst or the coked catalyst with an ammonium salt, ammonium hydroxide, gaseous ammonia, or mixtures thereof. The general theory behind these methods is that the activity losses of catalysts used in hydrocracking environments are caused by the agglomeration of the otherwise dispersed Group VIII active metal hydrogenation component, and the ammoniation treatments of the prior art aim to reverse this mechanism and redisperse the Group VIII active metal component.

Although the above-discussed prior art methods have met with some success, a major difficulty in their use is that the rejuvenation of the catalyst must be performed under carefully controlled conditions in the presence of ammonia or an ammonium ion-containing medium, with all the attendant equipment and chemical costs associated therewith. Further, and far more importantly, by focusing on rejuvenation procedures, these prior art techniques have been directed to correcting a problem (catalyst deactivation) once it has come into existence rather than preventing the problem by providing a catalyst resistant to deactivation during regeneration. Further still, these prior art procedures are of only limited usefulness, being applicable, for example, to catalysts containing palladium-exchanged zeolites stabilized with magnesium cations but being of at most only limited usefulness with many other hydrocracking catalysts. As an illustration, hydrocracking catalysts containing hydrogen-palladium zeolites have been found to be highly sensitive to ammonia or ammonium ion treatments, with collapse of the zeolitic crystal structure and virtually complete loss of catalytic activity being the end result of such treatment.

Unlike the above-discussed prior art techniques, U.S. Pat. No. 4,429,053, the disclosure of which is hereby incorporated by reference in its entirety, teaches a catalyst which overcomes the detrimental effects associated with regenerating hydrocracking catalysts for reuse in ammonia-deficient environments by being resistant to deactivation during regeneration. The disclosed catalyst is prepared by cation exchanging a Y type zeolite with rare earth cations, calcining the resultant rare earth-exchanged zeolite in the presence of water vapor at a water vapor partial pressure of at least about 0.2 p.s.i.a., ion-exchanging the ammonium exchanged zeolite with Group VIII noble metal cations, and mixing the resultant zeolite with a refractory oxide component and calcining the resultant mixture. Although this catalyst has been found to be active after regeneration under ammonia deficient hydrocracking conditions, it normally contains about 80 weight percent of the zeolite and therefore tends to be relatively expensive.

Accordingly, it is a major object of the invention to reduce the cost of Group VIII metal-exchanged, zeolitic hydrocracking catalysts. It is another object of the invention to provide a noble metal-exchanged zeolitic hydrocracking catalyst resistant to deactivation during regeneration and other high temperature operations. It is yet a further object of the invention to provide a noble metal-exchanged, zeolitic hydrocracking catalyst for use in a catalytic hydrocracking process wherein high temperature regenerations of the catalyst are periodically required without incurring substantial losses in catalytic hydrocracking activity. Another object of the invention is to provide a hydrocracking process taking advantage of the regeneration-resistant properties of the catalyst of the invention. These and other objects of the invention will become more apparent in light of the following description of the invention.

SUMMARY OF THE INVENTION

In accordance with the invention, it has now been found that the activity of a catalyst comprising a porous, inorganic refractory oxide component and reduced amounts of a Y-type zeolite containing Group VIII noble metal cations in an ammonia-deficient hydrocracking environment can be substantially maintained after periodic regenerations of the catalyst. It has been further found that the optimum activity of such a catalyst under ammonia-deficient hydrocracking conditions occurs when the catalyst contains between about 40 weight percent and about 70 weight percent of the zeolite based on the total weight of the catalyst composition. Accordingly, the invention is directed to a catalyst composition of highly improved properties, particularly with respect to exhibiting high activities with relatively low concentrations of zeolite and resisting losses in hydrocracking activity when regeneration by coke combustion is necessary after service in an ammonia-deficient hydrocracking environment.

In its broadest embodiment, the catalyst of the invention is a composition containing a porous, inorganic refractory oxide and a crystalline aluminosilicate Y zeolite that has been ion-exchanged with Group VIII noble metal cations. The Group VIII noble metal-containing zeolite is intimately mixed with the porous, inorganic refractory oxide in amounts such that the final dry mixture contains between about 40 weight percent and about 70 weight percent zeolite based on the weight of the mixture. Normally, the aluminosilicate Y zeolite used in the catalyst will have a silica-to-alumina mole ratio above about 5.0, preferably above about 6.0. The crystalline aluminosilicate Y zeolite used in the catalyst is preferably prepared by contacting an ammonium-exchanged Y zeolite with an aqueous fluorosilicate solution.

Catalysts of the invention have been found to have catalytic activity with respect to hydrocarbon conversion reactions and are useful in a variety of hydrocarbon conversion processes including hydrocracking processes, with particular use being found in a hydrocracking process employing an ammonia-deficient environment. In one specific embodiment of the invention, the hydrocracking catalyst of the invention is employed in the second hydrocracking zone of a petroleum refining process wherein a hydrocarbon feedstock is first treated in a petroleum refining process employing an integral hydrotreating-hydrocracking operation followed by further hydrocracking of unconverted components in a second hydrocracking zone wherein an ammonia-deficient environment exists.

DETAILED DESCRIPTION OF THE INVENTION

Figure 1:
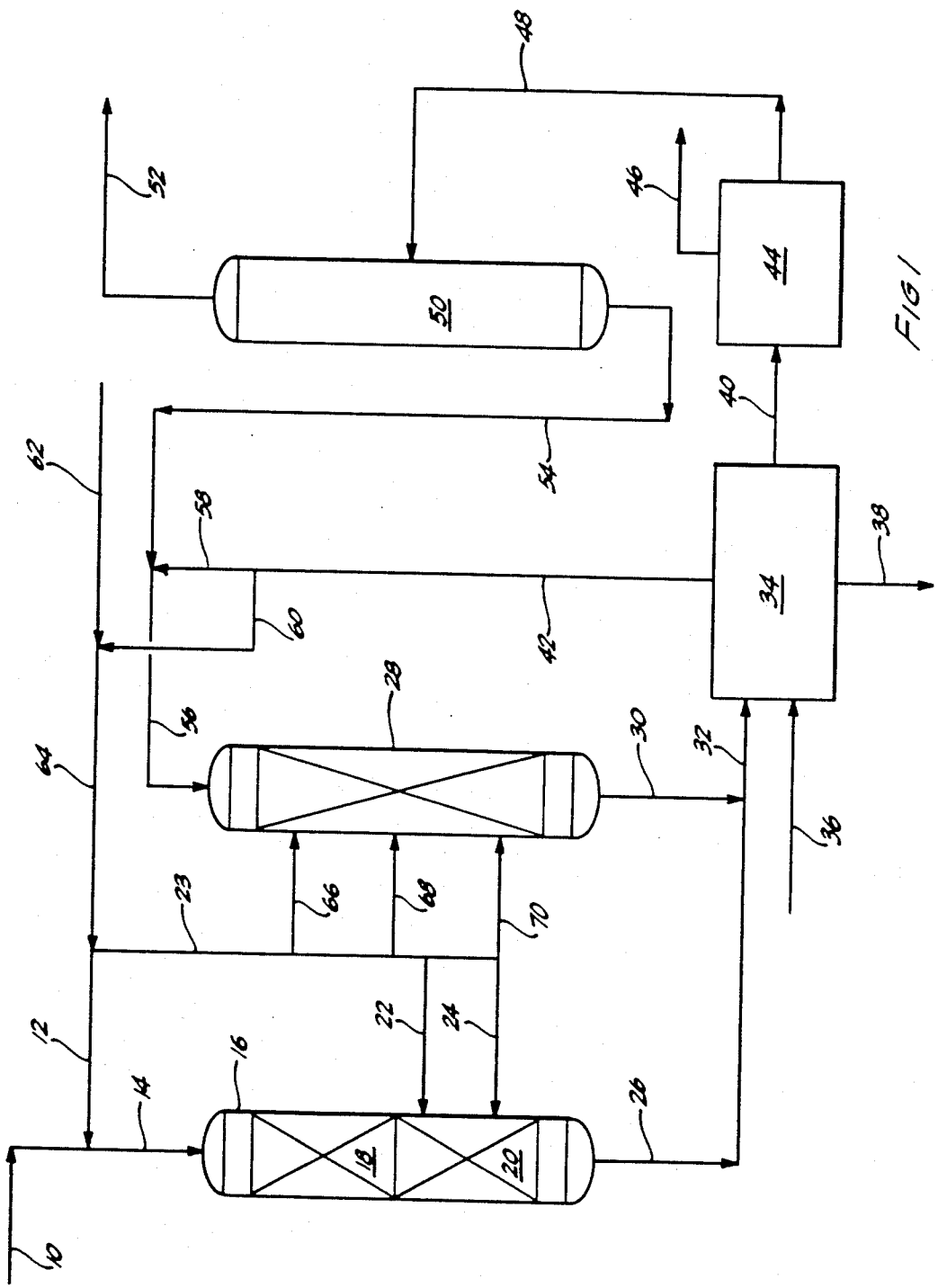
FIG. 1 in the drawing is a schematic flow diagram of a process for hydrocracking hydrocarbons carried out in accordance with the process of the invention while utilizing the catalyst of the invention.

The catalyst of the present invention may be prepared from a crystalline aluminosilicate zeolite of the Y-type. Normally, the Y zeolite starting material will be in the sodium form, containing between about 10 weight percent and about 14 weight percent sodium calculated as Na$_2$O. U.S. Pat. No. 3,130,007, the disclosure of which is hereby incorporated by reference in its entirety, describes Y-type zeolites having a silica-to-alumina mole ratio between about 3.0 and about 6.0, with a typical Y zeolite having a silica-to-alumina mole ratio of about 5.0. It is also known that Y-type zeolites can be produced having a silica-to-alumina mole ratio above about 6.0. Thus, for purposes of this invention, a Y-type zeolite is one having the characteristic crystal structure of a Y zeolite, as indicated by the essential X-ray diffraction pattern of Y zeolite, and a silica-to-alumina mole ratio above 3.0, and includes Y zeolites having a silica-to-alumina mole ratio above 6.0.

The Y zeolites of the invention will normally have a silica-to-alumina mole ratio above about 5.0, typically above about 6.0. Preferably, the Y zeolites of the invention will have a silica-to-alumina mole ratio between about 6.1 and about 10.0. The most highly preferred zeolites have a silica-to-alumina mole ratio between about 6.1 and about 7.0. Such zeolites are usually prepared from a Y zeolite starting material and will thus have the essential X-ray powder diffraction pattern of Y zeolite. It will be understood, however, that in converting a Y zeolite starting material to a zeolite useful in the present invention, the resulting zeolite may not have exactly the same X-ray powder diffraction pattern for Y zeolites as is disclosed in U.S. Pat. No. 3,130,007. The d-spacings may be shifted somewhat due to a shrinkage in the unit cell size which is due to the increase in the silica-to-alumina mole ratio. The essential crystal structure of Y zeolite will, however, be retained so that the essential X-ray powder diffraction pattern of the zeolites used in the invention will be consistent with that of either Y zeolite itself or a Y zeolite of reduced unit cell size. Normally, the unit cell sizes for zeolites used in the catalyst of the invention will be below 24.75 Angstroms, normally below 24.65 Angstroms.

A preferred zeolite for use in the catalyst of the invention is known as LZ-210, a zeolitic aluminosilicate molecular sieve available from the Linde Division of the Union Carbide Corporation. This zeolite is described in detail in European Patent Application No. 81110629.3 filed on December 20, 1981 and published on June 29, 1983 as EP 0 082211 A1, the disclosure of which is hereby incorporated by reference in its entirety. LZ-210 zeolite has an X-ray powder diffraction pattern consistent with a Y zeolite of reduced unit cell size and may be prepared, for example, so as to have an X-ray powder diffraction pattern falling in the ranges set forth in Table 1 below.

TABLE 1

| d (Angstroms) | Intensity |
| --- | --- |
| 14.17–13.97 | very strong |
| 8.68–8.55 | medium |
| 7.40–7.30 | medium |
| 5.63—5.55 | strong |
| 4.72–4.66 | medium |
| 4.34–4.28 | medium |
| 3.74–3.69 | strong |
| 3.28–3.23 | strong |

TABLE 1-continued

| d (Angstroms) | Intensity |
| --- | --- |
| 2.83–2.79 | strong |

LZ-210 zeolites are conveniently prepared in silica-to-alumina mole ratios between about 6.0 and about 15.0, although higher ratios are possible. Preferred LZ-210 zeolites have a silica-to-alumina mole ratio of about 6.1 to about 7.0. Typically, the unit cell size is at or below 24.65 Angstroms and will normally range between about 24.40 and about 24.65 Angstroms. LZ-210 zeolites having a silica-to-alumina mole ratio below 20.0 generally have a sorptive capacity for water vapor at 25° C. and 4.6 mm mercury water vapor partial pressure of at least 20 weight percent based on the anhydrous weight of the zeolite. Normally, the oxygen sorptive capacity at 100 mm mercury and −183° C. will be at least 25 weight percent.

LZ-210 zeolites are resistant to crystal collapse at elevated temperatures. These zeolites are stable in dry air at temperatures of at least 975° C., and are most often stable at a temperature of at least 1035° C. This resistance to crystal collapse compares favorably with a typical sodium Y zeolite that is ion-exchanged with ammonium ions and which collapses at a temperature of about 861° C.

In general, LZ-210 zeolites may be prepared from conventional Y zeolites by contacting a Y zeolite with an aqueous solution of a fluorosilicate salt, preferably a solution of ammonium fluorosilicate. The contacting is normally accomplished by placing an ammonium-exchanged Y zeolite into an aqueous reaction medium, such as an aqueous solution of ammonium acetate, and slowly adding an aqueous solution of ammonium hexafluorosilicate. After allowing the reaction to proceed, a zeolite having an increased silica-to-alumina mole ratio is produced. The magnitude of the increase is dependent at least in part on the amount of the fluorosilicate solution contacted with the zeolite and on the reaction time allowed. Normally, a reaction time of between about 10 and about 24 hours is sufficient for equilibrium to be achieved. The resulting solid product, which may be separated from the aqueous reaction medium by conventional filtration techniques, is a form of LZ-210 zeolite. In some cases this product may be contacted with steam for a period between about ¼ to about 3 hours at a temperature between about 900° F. and about 1500° F. with water vapor at a partial pressure of at least 0.2 p.s.i.a. in order to provide greater crystalline stability.

If the LZ-210 zeolite or other Y-type zeolite starting material contains a large amount of sodium, it is normally desirable to partially ion-exchange the zeolite with ammonium ions to lower the sodium content until it is less than about 0.5 weight percent, preferably less than about 0.2 weight percent, and most preferably less than about 0.05 weight percent, calculated as Na$_2$O. Ordinarily, the ion exchange is carried out such that at least 25 percent, often at least 50 percent, of the residual zeolitic sodium ions in the zeolite are exchanged with ammonium ions. The ammonium ion exchange is carried out by mixing the zeolite with an aqueous solution containing a dissolved ammonium salt, such as ammonium nitrate, ammonium sulfate, ammonium chloride, and the like. The resulting slurry is stirred for between about 1 and about 5 hours at temperatures above ambient but less than about 100° C. If sodium levels below 0.05 weight percent are desired, the ion exchange procedure will ordinarily have to be repeated at least once. Normally, the ion exchange procedure will be repeated at least twice and occasionally several times before a reduction in sodium content below 0.05 weight percent is achieved.

After the zeolite is dried, a Group VIII noble metal is incorporated into the zeolite by ion exchange. Normally, the Group VIII noble metal is ion exchanged into the zeolite before it is mixed with a refractory oxide component, but if desired the noble metal may be introduced by ion exchange at a time subsequent to mixing the zeolite and the refractory oxide component but prior to final calcination.

The Group VIII noble metals include platinum, palladium, rhodium, iridium, ruthenium and osmium. The preferred noble metals are platinum and palladium, with palladium being most preferred. If it is desired to ion exchange the Group VIII noble metal directly into the zeolite prior to mixing with the refractory oxide component, the dried ammonium Y zeolite described above is contacted with an aqueous solution of platinum dichloride or palladium dichloride. To facilitate the ion exchange, ammonium ions may also be introduced into the aqueous solution, normally in the form of ammonium hydroxide. The ion exchange is usually carried out such that at least 0.1 percent by weight, preferably between about 0.1 and about 2.0 weight percent of noble metal, calculated as the metal, is incorporated into the zeolite.

After the noble metal is ion exchanged into the zeolite, the zeolite is combined with a porous, inorganic refractory oxide component, or a precursor thereof, such as alumina, silica, titania, magnesia, zirconia, berylia silica-alumina, silica-magnesia, silica-titania, other such combinations and the like. Examples of precursors that may be used include peptized alumina, alumina gel, hydrated alumina, silica-alumina hydrogels, and silica sols. Normally, the porous, inorganic refractory oxide component or precursor thereof is mixed with the noble metal-ammonium zeolite in amounts such that the zeolite will comprise between about 40 percent and about 70 percent by weight of the final dry mixture, preferably between about 45 weight percent and about 65 weight percent, most preferably between about 50 weight percent and about 60 weight percent. The mixture is then formed into particulates, usually by extrusion through a die having openings of a cross-sectional size and shape desired in the final catalyst particles. The extruded material is then cut into lengths of from 1/16 to ½ inch. The resulting particles are subjected to a calcination at an elevated temperature, normally between about 600° F. and about 1600° F., to produce catalytic particles of high crushing strength.

In some instances it may be desirable that the Y zeolite used in the catalyst of the invention contain rare earth metal cations. If such is the case, the Y-type zeolite is normally ion-exchanged with rare earth metal cations before it is ion-exchanged with the Group VIII noble metal cations. The ion exchange is carried out by conventional techniques using any one or any combination of the lanthanide elements having atomic numbers between 57 and 71. Metals suitable for ion exchange include lanthanum, cerium, praeseodymium, neodymium, samarium, europium, gadolinium, terbium, dysprosium, holmium, erbium, thulium, ytterbium and lutetium. Normally, a mixture of rare earth cations is introduced into the zeolite, with the mixture often containing rare earth metals in a distribution similar to that of the rare earth ore from which the metals were derived. Such rare earth ores may include bastnaesite, monazite, zenotime and the like.

Hydroconversion catalysts prepared as described above are useful in the conversion of a wide variety of hydrocarbon feedstocks to a hydroconversion product of lower average boiling point and molecular weight. The feedstocks that may be subjected to hydroconversion by the method of the invention include mineral oils and synthetic oils such as shale oil, oil derived from tar sands, coal liquids and the like. Examples of appropriate feedstocks include straight run gas oils, vacuum gas oils, and catalytic cracking distillates. A typical hydroconversion feedstock normally contains between about 50 percent by volume and about 75 percent by volume of components boiling above the desired endpoint of the product. In the case of gasoline, the endpoint will generally be in the range of about 380° F. to about 420° F. The feedstock will normally also contain gas oil components boiling above about 550° F., and will preferably contain at least 30 volume percent of components boiling between about 600° F. and about 1000° F.

The catalyst of the invention will usually be employed as a fixed bed of catalytic particulates in a hydroconversion reactor vessel into which hydrogen and the feedstock are introduced and passed in a downwardly direction. The reactor vessel is maintained at conditions so as to convert the feedstock into the desired product, which is normally a hydrocarbon product containing a substantial proportion of gasoline components boiling in the range between about 185° F. and about 420° F. Other products, such as turbine fuel or diesel fuel, may also be desired on occasion, and conditions must be adjusted according to the product or distribution of products desired. In general, the temperature will be maintained between about 450° F. and about 850° F. The pressure will normally range between about 750 p.s.i.g. and about 3500 p.s.i.g., preferably between about 1000 p.s.i.g. and about 3000 p.s.i.g. The liquid hourly space velocity will range between about 0.3 and about 5.0, preferably between about 0.5 and about 3.0. The ratio of hydrogen gas to feedstock utilized will usually range between about 1000 and about 10,000 standard cubic feet per barrel, preferably between about 2000 and about 8000 standard cubic feet per barrel as measured at 60° F. and 1 atmosphere.

The noble metal hydroconversion catalyst of the invention is particularly useful in a hydrocracking reactor vessel wherein an ammonia-deficient atmosphere is maintained. Normally, a denitrogenated hydrocarbon feedstock containing hydrocarbon components boiling above a maximum desired temperature, such as above 420° F. when a gasoline product boiling below about 420° F. is required, is contacted with molecular hydrogen or a molecular hydrogen-containing gas in the presence of the noble metal catalyst of the invention under hydrocracking conditions to convert a substantial proportion of the 420° F.+hydrocarbon components to product components boiling in the desired gasoline range. Under such ammonia-deficient conditions, it has been found that prior art catalysts comprising a noble metal-exchanged zeolite cracking component lose substantial activity after coke and coke-like materials, which deposit on the catalyst during hydrocracking, are removed therefrom by a combustive regeneration treatment. It is believed that such activity losses are due to the migration and subsequent agglomeration of the active noble metals, but whatever the chemical mechanism by which such losses occur in the prior art catalysts, the catalyst of the present invention containing between about 40 weight percent and about 70 weight percent noble metal-exchanged zeolite resists deactivation and is regenerable by combustion of coke deposits without encountering activity losses.

It is, therefore, a specific embodiment of the invention to employ the hydroconversion catalyst of the invention in a hydrocracking reactor vessel wherein a hydrocarbon feedstock is treated under ammonia-deficient and preferably essentially ammonia-free hydrocracking conditions. The phrase "ammonia-deficient" as used herein refers to the situation where there is no more than 200 ppmv ammonia present in the hydrocracking zone. The phrase "essentially ammonia-free" as used herein refers to the situation where there is no more than 20 ppmv ammonia present in the hydrocracking zone. In both ammonia-deficient and essentially ammonia-free hydrocracking environments, and also in substantially completely ammonia-free environments, wherein the ammonia concentration in the hydrocracking zone does not exceed 3 ppmv, the catalyst of the invention proves to be a regenerable catalyst resistant to hydrocracking activity losses when coke deposits are removed from the catalyst by combustion.

FIG. 1 in the drawing illustrates another specific embodiment of the process of the invention in which the catalyst of the invention is utilized as a hydrocracking catalyst. In this embodiment of the process of the invention, a hydrocarbon feedstock is treated by an integral hydrotreating-hydrocracking operation followed by further hydrocracking of unconverted hydrocarbon components in an ammonia-deficient hydrocracking zone. The catalyst of the invention is employed in the ammonia-deficient hydrocracking zone, and also, if desired, in the first hydrocracking zone utilized in the integral operation. The hydrocarbon feedstock, which is a gas oil boiling above about 550° F., normally boiling in the range between about 550° F. and about 1200° F., is passed from a storage facility not shown in the drawing into line 10 where it is mixed with a hydrogen-containing gas introduced through line 12. The mixture is then passed through line 14 into reactor vessel 16 wherein the mixture passes through hydrotreating zone 18 in contact with a hydrotreating catalyst. The temperature in the hydrotreating zone will normally range between about 400° F. and about 1000° F., preferably between about 650° F. and about 800° F. The hydrotreating pressure will range between about 100 p.s.i.g. and about 5000 p.s.i.g., preferably between about 500 p.s.i.g. and about 2000 p.s.i.g. The liquid hourly space velocity will normally be in the range between about 0.1 and about 15, preferably between about 2.0 and about 7.0.

The catalyst utilized in the hydrotreating zone will normally be composed of a Group VIII hydrogenation metal component in combination with a Group VIB hydrogenation metal component, supported on an amorphous, porous, inorganic refractory oxide support such as alumina. In some cases phosphorous or other acid component may also be present in the combination. A preferred hydrotreating catalyst comprises a sulfided, particulate composition comprising a nickel or cobalt component, a molybdenum or tungsten component, and a phosphorous component on a support consisting essentially of alumina or alumina in combination with small amounts of silica. The catalyst is generally employed as a bed of particulates through which the feedstock and hydrogen-containing gas are passed downwardly under the conditions set forth above so as to convert the organonitrogen components in the feedstock to ammonia and the organosulfur components to hydrogen sulfide.

All of the products exiting hydrotreating zone 18 are passed directly into catalytic hydrocracking zone 20. The hydrocracking zone, as shown in FIG. 1, may be maintained in the lower portion of the same vessel containing the hydrotreating catalyst. Alternatively, the hydrocracking zone may be maintained in an entirely separate reactor vessel. In either case, the entire effluent from the hydrotreating zone is passed through the hydrocracking zone in contact with a hydrocracking catalyst under typical hydrocracking conditions so as to convert a specified percentage of the hydrotreated feedstock, such as 60 volume percent, to products boiling below a specified boiling endpoint, such as 400° F. for many gasolines. Normally, the temperature in the hydrocracking zone will range between about 600° F. and about 800° F. while the pressure is in the range between about 1000 p.s.i.g. and about 3000 p.s.i.g. The hydrocracking catalyst used may be the catalyst of the invention or a conventional catalyst such as the noble metal-exchanged, stabilized Y zeolite-containing catalyst designated as catalyst A in Example 16 of U.S. Pat. No. 3,897,397.

In order to control the temperature in hydrocracking zone 20, a hydrogen-containing quench gas is passed into the zone from header 23 via lines 22 and 24, respectively. The quench gas absorbs heat generated by the exothermic reactions occurring in the hydrocracking zone. Normally, the pressure in hydrocracking zone 20 and hydrotreating zone 18 is maintained at substantially the same value, regardless of whether the two zones are maintained in the same reactor vessel as shown in FIG. 1 or in separate reactor vessels. Operation in this manner makes it unnecessary to utilize pressure reducing or pressure increasing equipment between the two zones.

The effluent from hydrocracking zone 20 is passed from the bottom of reactor 16 into line 26 and then into line 32 where it is combined with the effluent in line 30 from hydrocracking reactor 28, which is described in more detail hereinafter. The resulting mixture is then passed into scrubbing zone 34 where the mixture is contacted with water introduced into the scrubbing zone through line 36. The water absorbs substantially all of the ammonia and some of the hydrogen sulfide in the mixture to produce sour water which is withdrawn from the scrubbing zone through line 38. An ammonia-free hydrocarbon liquid is removed from scrubbing zone 34 through line 40 while a hydrocarbon gas containing hydrogen, hydrogen sulfide and light hydrocarbon gases, and which is substantially free of ammonia, is removed from the scrubbing zone through line 42. A portion of this gas is recycled to reactor vessel 16 through lines 60, 64, 12 and 14. Hydrogen makeup gas from line 62 is also introduced into reactor vessel 16 via lines 64, 12 and 14.

The hydrocarbon liquid withdrawn from scrubbing zone 34 through line 40 is passed into low pressure separation zone 44 wherein a low BTU gas containing $C_1$ to $C_3$ hydrocarbons and substantially all of the hydrogen sulfide carried into the zone through line 40 is separated from the liquid and removed from the separation zone through line 46. A liquid product substantially free of nitrogen and sulfur constituents and normally boiling at temperatures at or above that of C₄ hydrocarbons is removed from the separation zone through line 48 and passed to distillation column 50. Here, the liquids are separated into a gasoline product, boiling normally in the C₄ to 400° F. range, and an unconverted bottoms fraction boiling above about 400° F. The gasoline product stream is removed overhead of the distillation column through line 52 while the unconverted bottoms fraction is withdrawn from the bottom of the distillation column through line 54.

The bottoms fraction in line 54 is mixed with the portion of the hydrogen-containing gas removed from scrubbing zone 34 through line 42 that is not recycled to reactor 16. This portion of the gas is passed into line 54 through line 58. The resultant mixture is passed through line 56 into hydrocracking reactor 28. Here the mixture of liquid and gas is passed downwardly through a fixed bed of the catalyst of the invention in an atmosphere that is ammonia-deficient, preferably essentially ammonia-free, and more preferably still, substantially completely ammonia-free. Because of the reduced ammonia content in the hydrocracking zone in reactor 28 as compared to that in hydrocracking zone 20 (wherein ammonia concentrations of about 2000 ppmv or higher are usually maintained), the hydrocracking conditions in hydrocracking reactor 28 are less severe and therefore substantially lower operating temperatures may be utilized while maintaining high conversion, conversions greater than about 60 volume percent, to products boiling below the desired end point. Usually, the operating temperature will be in the range between about 450° F. and about 600° F., whereas the operating temperature in hydrocracking zone 20 is higher, normally between about 600° F. and about 800° F. To control the temperature during the hydrocracking reactions taking place in hydrocracking reactor 28, hydrogen-containing quench gas from header 23 is introduced at various levels into the reactor via lines 66, 68, and 70.

The nature and objects of the invention are further illustrated by the following examples, which are provided for illustrative purposes only and not to limit the invention as defined by the claims. Example 1 demonstrates that the hydrocracking activity in an ammonia-deficient atmosphere of a catalyst containing a noble metal-exchanged Y zeolite in combination with a porous, inorganic refractory oxide varies with the zeolite content of the catalyst and is at an optimum when the zeolite content is in the critical range between about 40 weight percent and about 70 weight percent. Example 2 illustrates that a catalyst containing a zeolite in the concentration range set forth above is approximately as active in an ammonia-deficient atmosphere after regeneration by combustion as it is prior to regeneration.

EXAMPLE 1

Various hydrocracking catalysts containing different proportions of zeolite and alumina are prepared by mulling mixtures of steamed and ammonium-exchanged LZ-210 zeolite, peptized Catapal alumina and a small amount of Methocel, an extrusion aid. The LZ-210 zeolite has a silica-to-alumina ratio of 6.5 and a residual sodium content, calculated as Na₂O, of less than 0.2 weight percent after steaming and ammonium exchange. The mixtures are mulled for 30 minutes and then water is added while the mixtures are mulled for another 15 minutes. The mulled mixtures are then extruded through a 1/16 inch diameter die, dried and broken into particles varying in length up to about 1/2 inch. These particles are then exchanged with palladium metal cations by placing the 1/16 inch extrudates in a basket, suspending the basket in deionized water for 15 minutes and then placing the basket in a stirred solution of palladium dichloride and ammonium hydroxide in deionized water. After the extrudates are allowed to sit in the basket at room temperature for 2 hours, they are rinsed with deionized water, air dried and then oven dried overnight. The extrudates are then calcined by contacting them with hot air so that the temperature rises slowly to 900° F. where they are then held for 2 hours. Five catalysts containing between 40 weight percent and 90 weight percent zeolite are prepared as described above. A sixth catalyst containing 30 weight percent zeolite is also prepared as described above except that the LZ-210 zeolite utilized is ion-exchanged with rare earth cations prior to steaming and ammonium exchange by immersing the zeolite in a solution of rare earth chlorides containing cerium cations, lanthanum cations, neodymium cations, praseodymium cations and small amounts of other rare earth elements. The resultant rare earth-exchanged zeolite contains 7.6 weight percent rare earth oxides (calculated as RE₂O₃) After the six catalyst samples are prepared as described above, they are evaluated for hydrocracking activity under conditions similar to those in the stages of the hydrocracking process depicted in FIG. 1 of the drawing.

An evaluation of the hydrocracking activity under the ammonia-deficient conditions of second stage hydrocracking, which hydrocracking is equivalent to the hydrocracking that occurs in reactor 28 in the process depicted in FIG. 1, is carried out as follows. About 150 ml. of a catalyst containing a known amount of zeolite is placed in a laboratory size reactor vessel and activated by passing hydrogen through the fixed bed at a pressure of 1450 p.s.i.g. and a temperature of 700° F. The catalyst is then cooled to 450° F. and a gas oil feed and molecular hydrogen are passed through the catalyst bed in the reactor. The reactor is maintained at 1450 p.s.i.g. with a liquid hourly space velocity of 1.7 and a hydrogen-to-oil ratio of 8000 standard cubic feet per barrel. The gas oil feed is a denitrogenated, desulfurized, unconverted fraction obtained from a previous hydrocracking operation. To simulate a hydrogen sulfide-containing atmosphere as it exists in the second stage hydrocracking reactor of the process depicted in FIG. 1, thiophene is blended with the feedstock so as to provide a sulfur concentration therein of 0.5 weight percent. The temperature utilized in the reactor vessel is adjusted periodically to maintain a total liquid product gravity of 49.5° API, which by previously established correlations, corresponds to about a 60 volume percent yield of gasoline-type materials boiling below 420° F. After 100 hours of operation, the activity of the catalyst is determined by measuring the temperature in the reactor.

After the catalyst has been evaluated for second stage hydrocracking activity, it is evaluated for hydrocracking activity under ammonia-rich conditions or conditions similar to those that exist in the first stage hydrocracking zone 20 shown in FIG. 1 of the drawing. These tests are carried out similarly to the activity tests described above except that the catalyst used is the catalyst which remains after the second stage activity test ha been completed. Also, in addition to adding thiophene to the hydrocarbon feed gas oil, tertiary butyl amine is added to simulate an ammonia-rich atmosphere. The operating temperature is adjusted periodically to maintain a total liquid product gravity of 47.0° API, which, by previously established correlations, corresponds to about a 40 percent yield of gasoline-type products boiling below 420° F. The operating temperature or activity after 100 hours is measured.

Figure 2:
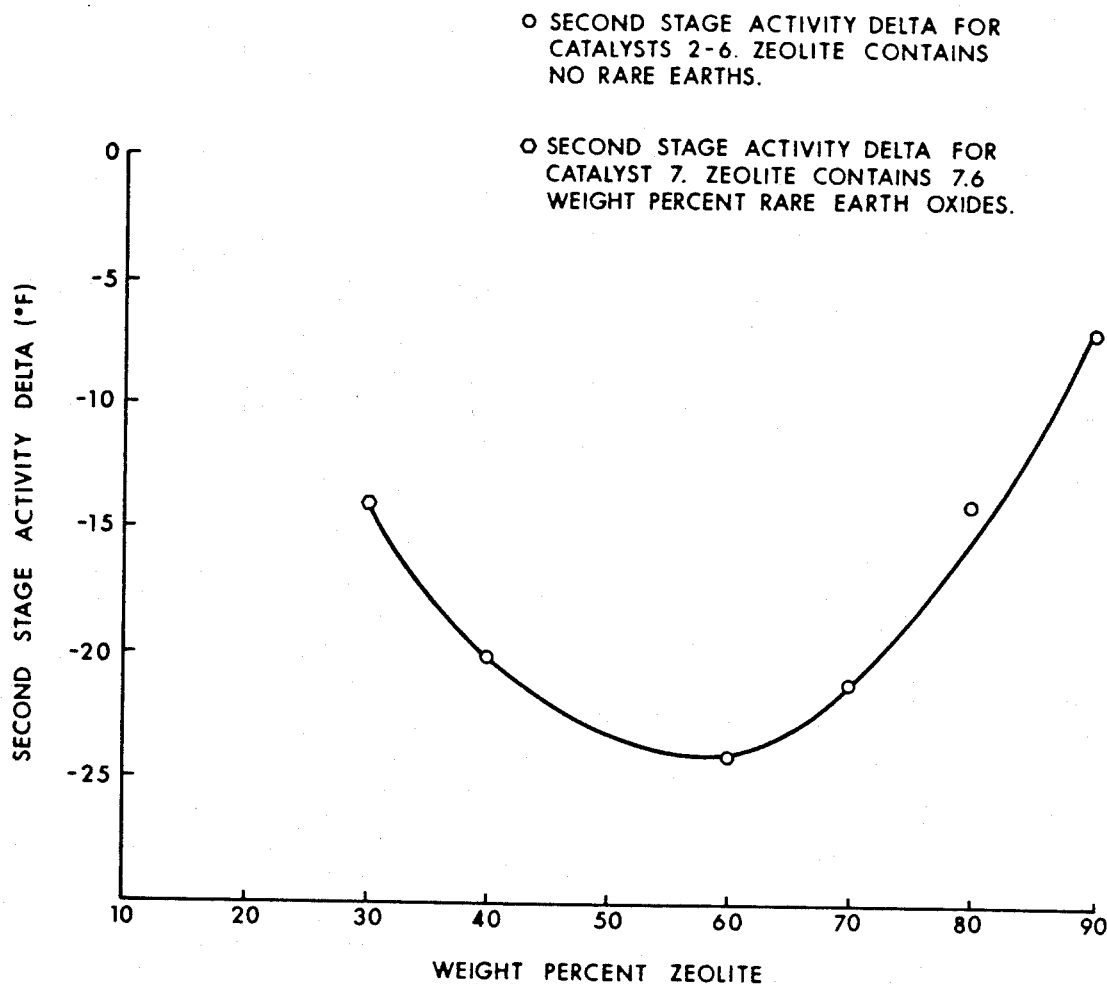
FIG. 2 is a plot which shows that the activity of a catalyst tested in a second stage hydrocracking zone under ammonia-deficient conditions similar to those in the second stage hydrocracking zone shown in FIG. 1 is at an optimum when the zeolite content is between about 40 weight percent and about 70 weight percent.

The results of the above-described activity tests are set forth below in Table 2 wherein the six catalysts are identified as catalysts 2 through 7. The relevant physical and chemical properties of the catalysts are also listed in the table. The activities are identified as deltas equal to the activity measured for the given catalyst minus an activity of a reference catalyst shown in the table as catalyst 1. This reference catalyst is composed of 20 weight percent alumina and 80 weight percent of a Y zeolite, with sufficient palladium exchanged into the zeolite such that the catalyst composition contains 0.54 weight percent palladium (calculated as the metal). The reference catalyst is prepared in a manner similar to that of catalyst A described in Example 16 of U.S. Pat. Nos. 3,897,327 and 3,929,672, the disclosures of which patents are herein incorporated by reference in their entirety. The activity of the reference catalyst is evaluated in the same manner as the activity of catalysts 2 through 7. The activity data for second stage hydrocracking are also shown in FIG. 2 as a plot of weight percent zeolite in a catalyst versus the activity measured for that catalyst minus the activity of the reference catalyst.

and about 70 weight percent, preferably between about 45 weight percent and about 65 weight percent, and most preferably between about 50 weight percent and about 60 weight percent.

The first stage activity deltas listed in Table 2 indicate that as the zeolite concentration drops from 90 weight percent to 60 weight percent, the first stage hydrocracking activity increases slightly as indicated by a decrease in the activity delta from −3° F. to −7° F. This improvement in first stage activity upon decreasing the zeolite content is remarkable in light of the accepted belief that the acidic zeolite component imparts cracking activity to the catalyst under ammonia-rich first stage conditions where acidity is limited. (In other words, decreasing the amount of zeolite should presumably decrease the activity, yet the results indicate just the opposite.) As the zeolite content further decreases from 60 to 40 weight percent, the first stage hydrocracking activity decreases as indicated by an increase in the activity delta from −7° F. to +6° F.

Two additional catalysts, catalysts 8 and 9, are prepared as follows. Catalyst 8 is prepared similarly to catalyst 7, i.e., the LZ-210 zeolite utilized is ion-exchanged with rare earth cations prior to steaming and ammonium exchange by immersing the zeolite in a solution of rare earth chlorides containing cerium cations, lanthanum cations, neodymium cations, praseodymium cations and small amounts of other rare earth elements.

TABLE 2

| Catalyst Number | Composition (% Zeolite) | % Alumina | Palladium (Weight %) | Surface Area (meters$^2$/gram) | Crystallinity (%) | Activity Deltas[a](°F.) 1st Stage | 2nd Stage |
|---|---|---|---|---|---|---|---|
| 1 | 80[b] | 20 | 0.54 | 620 | 50 | 0 | 0 |
| 2 | 90 | 10 | 0.80 | 748 | 76 | −3 | −7 |
| 3 | 80 | 20 | 0.77 | 728 | 75 | −6 | −14 |
| 4 | 70 | 30 | 0.77 | 654 | 52 | −6 | −21 |
| 5 | 60 | 40 | 0.77 | 597 | 45 | −7 | −24 |
| 6 | 40 | 60 | 0.78 | 473 | 33 | +6 | −20 |
| 7 | 30[c] | 70 | 0.84 | 383 | 19 | +12 | −14 |
| 8 | 40[c] | 60 | 0.77 | 449 | 27 | +1 | −20 |
| 9 | 40[c] | 60 | 0.77 | 452 | 23 | +1 | −22 |
| 1R[d] | 80 | 20 | 0.54 | 620 | 50 | 0 | +27 |
| 6R[d] | 40 | 60 | 0.77 | 473 | 33 | +6 | −17 |

[a] Activity of the catalyst minus the reference activity, which is the activity of catalyst 1.
[b] Contains the zeolite of U.S. Pat. No. 3,897,327. All other catalysts contain LZ-210 zeolite.
[c] Zeolite contains 7.6 weight percent rare earth oxides.
[d] These catalyst were coked and regenerated.

It can be seen from the data for catalysts 2 through 7 set forth in Table 2 and in FIG. 2 that the hydrocracking activity in the second stage, which contains little if any ammonia, is highly sensitive to the amount of zeolite present in the catalyst composition. At a zeolite content less than about 40 weight percent, the activity delta, the difference between the activity of the experimental catalyst and the activity of the reference catalyst, is relatively high. As the zeolite content increases from 40 weight percent, the activity delta decreases, thereby indicating an increase in activity of the experimental catalyst. The activity delta continues to decrease until a zeolite content of between about 50 and about 60 weight percent is reached. The activity delta then begins to increase slightly, thereby indicating a slight decrease in activity. Above a zeolite content of about 70 weight percent, the activity delta, and therefore the temperature needed to maintain the desired conversion, continues to increase, thereby indicating a gradual decrease in activity. The data in FIG. 2 clearly indicate that the critical range of zeolite content for obtaining optimum activity in an ammonia-deficient hydrocracking environment is between about 40 weight percent The resultant rare earth-exchanged zeolite contains 7.6 weight percent rare earth oxides (calculated as $RE_2O_3$). The zeolite is then combined with alumina in accordance with the procedures described above such that the final catalyst contains 40 weight percent rare earth-exchanged zeolite and 60 weight percent alumina. Catalyst 9 is prepared similarly to catalyst 8 except that the zeolite powder is exchanged with palladium prior to mulling it with the peptized alumina and extruding the resultant mixture. Catalysts 2 through 8 are all prepared by first mulling the zeolite with the peptized alumina, extruding the mulled mixture into extrudates and then exchanging the extrudates with palladium cations. Both catalysts 8 and 9 are evaluated for hydrocracking activity in first and second stage hydrocracking as described above. The results of the activity testing on catalysts 8 and 9 are set forth in Table 2.

A comparison of the activity data for catalyst 6 with the activity data for catalyst 8, both of which contain 0 weight percent zeolite, indicates that the presence of the rare earth oxides in the zeolite of catalyst 8 has no effect on second stage activity but increases first stage activity. These data justify the use of the activity delta for catalyst 7 in the plot of FIG. 2. These data also illustrate that the presence of rare earths in the zeolite can compensate for the lost activity in the first stage when the zeolite content is decreased from 60 weight percent to 40 weight percent as indicated by the activity data for catalysts 5 and 6. The activity data for catalysts 8 and 9 are approximately the same and indicate that the respective procedures for preparing these two catalysts, including the point in time when the palladium exchange is carried out, are viable alternatives for use in commercially producing the catalyst of the invention. In catalyst 8 the palladium is directly exchanged onto the finished catalyst particles after the zeolite has been composited with the alumina. Catalyst 9, on the other hand, is prepared by first exchanging the zeolite with the palladium and then compositing it with the alumina binder.

EXAMPLE 2

In this series of tests, the activity of catalysts 1 and 6 are evaluated after regeneration by coking the catalyst after the first and second stage activities are measured. The catalysts are coked by hydrocracking in an ammonia-rich atmosphere which requires more severe conditions to produce the desired gasoline-type product. The ammonia-rich conditions are simulated by introducing tertiary butyl amine into the hydrocracking reactor at a rate equivalent to about 1 gram of nitrogen for 500 grams of feed. The reactor temperature is then adjusted to 800° F. and the pressure decreased to 100 p.s.i.g. At the end of a 12 hour time period, the catalysts are in a coked condition.

After coking, the catalysts are regenerated by a controlled oxidative combustion at temperatures ranging between about 700° F. and about 1000° F. utilizing a flowing regeneration gas consisting essentially of nitrogen and oxygen. The oxygen content of the regeneration gas is increased from 0.1 to 3.0 volume percent as necessary to maintain a water vapor partial pressure in the gaseous combustion products at values below about 0.25 p.s.i.a. The regenerated catalyst particles are then evaluated for hydrocracking activity in accordance with the tests described in Example 1. The results of the activity testing on regenerated catalysts 1 and 6 are set forth in Table 2 and designated as catalysts 1R and 6R, respectively.

A comparison of the activity data obtained for catalyst 1 with the activity data obtained for regenerated catalyst 1R indicates that the activity in first stage or ammonia-rich hydrocracking of a coked and regenerated catalyst containing 80 weight percent zeolite is about the same as that for a fresh catalyst. The activity delta of the coked and regenerated catalyst in the second stage or the ammonia-deficient stage, however, increases approximately 27° F. thereby indicating a severe loss in activity after regeneration. A comparison of the activity data obtained for catalyst 6 with that obtained for catalyst 6R indicates that reducing the zeolite content of the composition results in obtaining nearly the same activity in the second stage under ammonia-deficient hydrocracking conditions using a regenerated catalyst as is obtained using a fresh catalyst containing the same amount of zeolite. The activity delta in the first stage for catalyst 6 is the same as in the first stage for catalyst 6R thereby indicating that the first stage activity of a catalyst with reduced zeolite content does not suffer upon regeneration. It is believed that the high second stage activities for regenerated catalysts having reduced amounts of zeolites is due to the fact that the noble metal may be better dispersed in the catalyst because of the greater proportion of alumina present. Preliminary results indicate that catalysts containing reduced amounts of rare earth-exchanged zeolites may not retain their activity for hydrocracking under ammonia-deficient conditions after regeneration as well as catalysts containing reduced levels of zeolites that have not been ion-exchanged with rare earths; however, sufficient data is not presently available to establish this as fact.

It will be apparent from the foregoing that the invention provides a catalyst which exhibits increased hydrocracking activity under ammonia-deficient conditions and which after regeneration exhibits an activity nearly equal to the activity of the fresh catalyst. Thus, the catalyst is ideally suited for use in an ammonia-deficient catalytic hydrocracking process wherein high temperature regenerations of the catalyst are periodically required.

Although this invention has been primarily described in conjunction with examples and by reference to several embodiments of the invention, including a preferred embodiment, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

I claim:

1. A hydrocracking process which comprises contacting a hydrocarbon feedstock with molecular hydrogen in the presence of a hydrocracking catalyst under hydrocracking conditions in an atmosphere which contains no more than about 200 ppmv ammonia, wherein said catalyst comprises:
    (a) a porous, inorganic refractory oxide component; and
    (b) between about 40 weight percent and about 70 weight percent of a crystalline aluminosilicate Y zeolite, said zeolite having been ion-exchanged with Group VIII noble metal cations.

2. A process as defined by claim 1 wherein said hydrocracking process is carried out in an atmosphere which contains no more than about 20 ppmv ammonia.

3. A process as defined by claim 1 wherein said crystalline aluminosilicate Y zeolite has a silica-to-alumina mole ratio above about 6.0.

4. A process as defined by claim 3 wherein said crystalline aluminosilicate Y zeolite is prepared by contacting a Y zeolite with an aqueous solution of a fluorosilicate salt.

5. A process as defined by claim 3 wherein said crystalline aluminosilicate Y zeolite is prepared by contacting an ammonium-exchanged Y zeolite with an aqueous solution of ammonium hexafluorosilicate.

6. A process as defined by claim 3 wherein said crystalline aluminosilicate Y zeolite has a silica-to-alumina mole ratio between about 6.1 and about 7.0.

7. A process as defined by claim 1 wherein said crystalline aluminosilicate Y zeolite has been ion-exchanged with rare earth-containing cations.

8. A process as defined by claim 3 wherein said Group VIII noble metal cations comprise palladium cations and said porous, inorganic refractory oxide component comprises alumina.

9. A process as defined by claim 6 wherein said Group VIII noble metal cations comprise palladium cations and said porous, inorganic refractory oxide component comprises alumina.

10. A process as defined in claim 1 wherein said catalyst has been regenerated by the combustion of coke.

11. A process as defined by claim 1 wherein said crystalline aluminosilicate Y zeolite has a silica-to-alumina mole ratio between about 6.1 and about 7.0 and is prepared by contacting an ammonium-exchanged Y zeolite with an aqueous solution of ammonium hexafluorosilicate, said Group VIII noble metal cations comprise palladium cations, and said porous, inorganic refractory oxide component comprises alumina.

12. A process as defined by claim 3 wherein said hydrocracking catalyst comprises between about 45 and about 65 weight percent of said crystalline aluminosilicate Y zeolite.

13. A process as defined by claim 3 wherein said hydrocracking catalyst comprises between about 55 and about 65 weight percent of said crystalline aluminosilicate Y zeolite.

14. A process as defined by claim 3 wherein said hydrocracking catalyst comprises between about 60 and about 70 weight percent of said crystalline aluminosilicate Y zeolite.

15. A process as defined by claim 4 wherein said crystalline aluminosilicate Y zeolite comprises LZ-210 zeolite.

16. A process as defined by claim 9 wherein said crystalline aluminosilicate Y zeolite comprises LZ-210 zeolite.

17. A process as defined by claim 13 wherein said crystalline aluminosilicate Y zeolite has a silica-to-alumina mole ratio between 6.1 to 7.0, said Group VIII noble metal cations comprise palladium cations and said porous, inorganic refractory oxide component comprises alumina.

18. A process as defined by claim 17 wherein said crystalline aluminosilicate Y zeolite comprises LZ-210 zeolite.

19. A process as defined by claim 3 wherein said hydrocracking catalyst comprises between about 50 and about 60 weight percent of said crystalline aluminosilicate Y zeolite.

20. A process for refining hydrocarbon feedback containing organonitrogen components, organosulfur components or a mixture thereof, which process comprises:
(a) contacting said feedback with molecular hydrogen under hydrotreating conditions in the presence of a hydrotreating catalyst comprising a Group VIB metal component and a Group VIII metal component such that a substantial proportion of the organonitrogen components, organosulfur components or mixture thereof is converted to ammonia, hydrogen sulfide or a mixture thereof;
(b) contacting substantially all of the effluent from step (a) with molecular hydrogen in a first hydrocracking zone in the presence of a first hydrocracking catalyst comprising a zeolite and a hydrogenation component to produce a hydrocracking product of substantially lower boiling point;
(c) separating said hydrocracking product into a higher boiling fraction and a lower boiling fraction;
(d) contacting said higher boiling fraction with molecular hydrogen in a second hydrocracking zone under hydrocracking conditions in an atmosphere which contains no more than about 200 ppmv ammonia and in the presence of a second hydrocracking catalyst to convert said higher boiling fraction into lower boiling products, wherein said second hydrocracking catalysts comprises;
(1) a porous, inorganic refractory oxide component; and
(2) between about 40 weight percent and about 70 weight percent of a crystalline aluminosilicate Y zeolite having a silica-to-alumina mole ratio above about 6.0 intimately mixed with said refractory oxide component, said crystalline aluminosilicate Y zeolite having been ion-exchanged with Group VIII noble metal cations.

21. A process as defined by claim 20 wherein said first hydrocracking catalyst is the same as said second hydrocracking catalyst and wherein said second hydrocracking catalyst is periodically regenerated by the combustion of coke.

22. A process as defined by claim 20 wherein said crystalline aluminosilicate Y zeolite has a silica-to-alumina mole ratio between about 6.1 and about 7.0 and is prepared by contacting an ammonium-exchanged Y zeolite with an aqueous solution of ammonium hexafluorosilicate, said Group VIII noble metal cations comprise palladium cations and said porous, inorganic refractory oxide component comprises alumina.

* * * * *

UNITED STATES PATENT AND TRADEMARK OFFICE
CERTIFICATE OF CORRECTION

PATENT NO. : 4,857,169

DATED : August 15, 1989

INVENTOR(S) : Suheil F. Abdo

It is certified that error appears in the above-identified patent and that said Letters Patent is hereby corrected as shown below:

Column 17:

Claim 19, line 46, delete "60" and insert --65--.

Claim 20, column 17, line 48, after "refining" insert --a--; line 48, delete "feedback" and insert --feedstock--; column 18, line 3, delete "feedback" and insert --feedstock--.

Signed and Sealed this

Sixth Day of July, 1993

Attest:

MICHAEL K. KIRK

*Attesting Officer*   Acting Commissioner of Patents and Trademarks